US006510416B1

(12) United States Patent
Lad

(10) Patent No.: US 6,510,416 B1
(45) Date of Patent: Jan. 21, 2003

(54) METHOD AND APPARATUS FOR PERFORMING REFUELING TRANSACTIONS USING CUSTOMER-ISSUED SPEECH COMMANDS

(75) Inventor: Dinesh Lad, Fort Wayne, IN (US)

(73) Assignee: Tokheim Corporation, Fort Wayne, IN (US)

( * ) Notice: Subject to any disclaimer, the term of this patent is extended or adjusted under 35 U.S.C. 154(b) by 0 days.

(21) Appl. No.: 09/379,557

(22) Filed: Aug. 23, 1999

(51) Int. Cl.[7] ......................... G10L 21/06; G10L 15/04; B65B 3/00

(52) U.S. Cl. ......................... 704/275; 704/251; 141/40; 141/231; 141/94

(58) Field of Search ................................ 704/251, 270, 704/258; 700/236; 141/231, 40, 230, 94

(56) References Cited

U.S. PATENT DOCUMENTS 4,247,899 A * 1/1981 Schiller et al. ............. 705/413
4,250,550 A * 2/1981 Fleischer .................... 704/270
4,506,142 A 3/1985 Takano et al.
4,520,576 A 6/1985 Vander Molen
4,590,604 A 5/1986 Feilchenfeld
4,660,153 A 4/1987 Yamashita et al.
5,170,361 A * 12/1992 Reed .......................... 700/283
5,335,313 A 8/1994 Douglas
5,383,500 A * 1/1995 Dwars et al. ................. 141/98
5,450,525 A 9/1995 Russell et al.
5,506,570 A 4/1996 Scott et al.
5,644,119 A 7/1997 Padula et al.
5,719,779 A 2/1998 Shuler et al.
5,758,322 A 5/1998 Rongley
5,798,931 A * 8/1998 Kaehler ...................... 700/231
5,812,978 A 9/1998 Nolan
5,839,104 A * 11/1998 Miller ........................ 704/251
6,115,649 A * 9/2000 Sakata ........................ 700/241
6,360,141 B1 * 3/2002 Jensen ........................ 700/236
6,367,516 B1 * 4/2002 Christman et al. .......... 141/231
6,390,151 B1 * 5/2002 Christman et al. .......... 141/231

FOREIGN PATENT DOCUMENTS

DE 418744 A2 * 3/1991 ............. B60S/5/02
JP 03-191906 * 8/1991 ........... A47B/37/00

* cited by examiner

*Primary Examiner*—Richemond Dorvil
*Assistant Examiner*—Daniel Nolan
(74) *Attorney, Agent, or Firm*—Randall J. Knuth

(57) ABSTRACT

A fuel delivery system performs a refueling operation in accordance with voice command signals audibly provided by a customer situated within a vehicle positioned for refueling. The customer generates audio signals representative of refueling transaction information, such as a request to initiate fuel dispensing activity, data indicative of the fuel type, fuel volume, purchase amount, and form of payment, and a request to terminate the refueling transaction. A microphone detects the customer voice signals and provides audio detection signals representative thereof. A speech recognition device converts the audio detection signals into corresponding fuel dispensing command signals. A controller generates fuel dispensing control signals in accordance with the fuel dispensing command signals and couples these control signals to the fuel dispenser assembly to effect operative control thereof. A speaker unit permits bidirectional audio communications between the customer and an operator messaging facility, which can optionally provide real-time operator voice communications or prerecorded voice messaging instructions.

18 Claims, 5 Drawing Sheets

METHOD AND APPARATUS FOR PERFORMING REFUELING TRANSACTIONS USING CUSTOMER-ISSUED SPEECH COMMANDS

BACKGROUND OF THE INVENTION

1. Field of the Invention

The present invention relates to a method and apparatus for dispensing fuel into a vehicle in connection with a refueling transaction request, and, more particularly, to a fuel delivery system that controllably dispenses fuel based upon refueling transaction information provided by the customer in the form of voice communication signals.

2. Description of the Related Art

The standard configuration for a commercial refueling installation typical includes fuel dispensing equipment having a hose and nozzle assembly that is manually maneuvered by the customer into refueling engagement with the fill pipe of the vehicle fuel tank. The customer may tender payment using a debit or credit card-type transaction processing machine that is conventionally provided with the fuel dispensing equipment. The development of such stand-alone fuel dispensing units, which can operate autonomously from any operator assistance or governance, has enabled service stations to streamline their operations and ostensibly lower their labor requirements. Service stations have therefore been able to make the transition from full-service activity, which required a station employee to manually dispense fuel and collect payment while the customer remained in the vehicle, to customer-directed refueling activity in which the customer performs every aspect of the refueling operation and typically makes payment via an electronic commerce transaction, all without the need for operator assistance.

However, this shift in responsibility for handling the refueling activity created an undesirable situation for those individuals possessed of a handicap, physical impairment, or other such disability who rely exclusively upon operator assistance to perform such physical tasks as positioning the fuel dispensing nozzle into the fuel tank, removing and replacing the nozzle assembly when the transaction is complete, and interfacing with the electronic payment module to execute a payment transaction. For these individuals, the tasks of exiting and reentering a vehicle are difficult, time consuming, and require the expenditure of significant effort on the part of both the individual and any handicap-assisted mobilizing equipment. In recognition of these and other limitations of the handicapped community, federal legislation was enacted in the form of the Americans With Disability Act (ADA) to require places of public accommodation and private facilities meeting certain criteria to provide handicap accessibility.

The current trend in the refueling service industry towards placing the refueling activity entirely under the control of the customer clearly presents serious challenges to handicapped persons, and makes refueling transactions involving such customer participation virtually inaccessible to the disabled. What is therefore needed is a means by which current refueling installations can be improved to permit equal access to the handicapped and other individuals who out of necessity or choice remain in the vehicle during the entire refueling transaction.

SUMMARY OF THE INVENTION

According to the present invention there is provided a fuel delivery system which employs a fuel dispenser assembly to controllably dispense fuel into a vehicle positioned for refueling. A customer situated in the vehicle generates audio signals which represent refueling transaction information, such as a request to initiate a refueling transaction, fuel data indicative of the type of fuel to be purchased, volume data indicative of the amount of fuel to be purchased, purchase amount data indicative of the dollar amount/volume of fuel to be purchased, payment data indicative of the manner of payment, and a request to terminate the fuel dispensing activity. In a preferred form of the system, the audio signals correspond to voice command information spoken by the customer.

An audio receiver such as a microphone is integrally associated with the fuel dispensing equipment to detect the audio signals generated by the customer and to provide audio detection signals representative thereof. A signal converter such as a speech recognition device transforms the audio detection signals provided by the audio receiver into corresponding fuel dispensing command signals for use in controlling the fuel dispensing activity of the fuel dispenser assembly. In particular, a controller is provided to generate fuel dispensing control signals in accordance with the fuel dispensing command signals provided by the signal converter. The control signals are then coupled to the fuel dispenser assembly to effectuate operative control thereof. An audio transmitter such as a speaker unit may be provided in integral association with the fuel dispensing equipment to facilitate bidirectional audio communications between the customer and an operator messaging facility. This messaging facility can optionally provide real-time operator voice communications or furnish prerecorded voice messaging instructions.

The invention, in one form thereof, relates to a fuel delivery system comprising a fuel dispenser assembly operatively arranged to controllably dispense fuel into a vehicle positioned for refueling, and a control assembly operatively arranged to control the fuel dispensing activity of the fuel dispenser assembly in response to and in accordance with at least one voice command signal generated by the vehicle customer.

The control assembly, in one form thereof, further includes a speech recognition device, which is responsive to the at least one voice command signal generated by the customer, for transforming the at least one voice command signal into at least one corresponding fuel dispenser control signal useful in controlling the fuel dispenser assembly. A means is provided for applying the at least one corresponding fuel dispenser control signal to the fuel dispenser assembly to effect operative control thereof. The control assembly is preferably provided in the form of a microphone to detect the at least one voice command signal generated by the customer and to provide a voice detection signal representative thereof to the speech recognition device. A speaker is preferably provided to enable audio communication with the customer.

In accordance with one mode of operation, the control assembly performs a refueling transaction procedure involving prompting the customer to provide refueling transaction information; detecting voice signals representing refueling transaction information which are audibly provided by the customer in response to the prompting; converting the detected voice signals into corresponding fuel dispenser control signals; and controlling the fuel dispenser assembly in accordance with the corresponding fuel dispenser control signals. The refueling transaction information includes at least one of a request to initiate a refueling transaction, fuel data indicative of the type of fuel to be purchased, volume data indicative of the amount of fuel to be purchased, purchase amount data indicative of the dollar amount of fuel to be purchased, payment data indicative of the manner of payment, and a request to terminate the fuel dispensing activity.

The fuel delivery system may optionally include an onboard vehicle input device, which is responsive to customer input information provided by the customer that is indicative of refueling transaction commands, for producing audio control information representative of the customer input information. A signal means transmits at least one voice signal in accordance with the audio control information produced by the input device for reception by the control assembly.

The invention, in another form thereof, is directed to a fuel delivery system which comprises, in combination, a fuel dispenser means responsive to fuel dispensing control signals for controllably dispensing fuel into a vehicle positioned for refueling; a control means, responsive to fuel dispensing command signals, for generating fuel dispensing control signals in accordance with the fuel dispensing command signals and providing the fuel dispenser means with the generated fuel dispensing control signals; an audio reception means for detecting audio signals generated by the customer and providing audio detection signals representative thereof, wherein the audio signals generated by the customer are representative of refueling transaction information; and a means, responsive to the audio detection signals provided by the audio reception means, for transforming the audio detection signals into corresponding fuel dispensing command signals for use by the control means.

The transforming means preferably includes a speech recognition device, while the audio reception means includes a microphone. A speaker is further provided to enable voice communication with the customer.

In one illustrative operating mode of the fuel delivery system, a refueling transaction procedure is executed which involves prompting the customer to provide refueling transaction information; detecting audio signals representing refueling transaction information which are audibly provided by the customer in response to the prompting; converting the detected audio signals into corresponding fuel dispenser control signals; and controlling the fuel dispenser means in accordance with the corresponding fuel dispenser control signals. The customer refueling transaction information includes at least one of a request to initiate a refueling transaction, fuel data indicative of the type of fuel to be purchased, volume data indicative of the amount of fuel to be purchased, purchase amount data indicative of the dollar amount of fuel to be purchased, payment data indicative of the manner of payment, and a request to terminate the fuel dispensing activity.

The invention, in another form thereof, relates to method of performing a refueling transaction in association with a vehicle positioned for refueling. In accordance with such method, a fuel dispenser system is provided which is operatively arranged for use in controllably dispensing fuel into the vehicle. Audio signals generated by the customer which represent command information pertaining to a refueling transaction request are detected. The detected audio signals are transformed into corresponding fuel dispenser control signals. The fuel dispensing activity of the fuel dispenser system is then controlled in accordance with the corresponding fuel dispenser control signals.

The command information pertaining to a refueling transaction request includes at least one of a request to initiate a refueling transaction, fuel data indicative of the type of fuel to be purchased, volume data indicative of the amount of fuel to be purchased, purchase amount data indicative of the dollar amount of fuel to be purchased, payment data indicative of the manner of payment, and a request to terminate the fuel dispensing activity.

The invention, in yet another form thereof, is directed to a method of performing a refueling transaction in association with a vehicle positioned for refueling. In accordance with such method, there is provided a fuel dispenser system which is operatively arranged for use in controllably dispensing fuel into the vehicle. The customer is provided with a menu of information defining a plurality of refueling transaction parameters. The customer is then prompted to make a selection regarding a one of the plurality of refueling transaction parameters. Detection is made of an audio signal generated by the customer which is representative of the selection made by the customer in response to the prompting regarding the one refueling transaction parameter. The detected audio signal is then transformed into a corresponding fuel dispenser control signal. The prompting step, the detecting step, and the transforming step are then repeated with respect to at least another one of the plurality of refueling transaction parameters. The fuel dispensing activity of the fuel dispenser system is controlled in accordance with the corresponding fuel dispenser control signals provided in connection with each iteration of the prompting step, the detecting step, and the transforming step.

The prompting step further includes the step of providing at least one of a visual display of the menu of information and an audio transmission of the menu of information. The selections made by the customer in response to the prompting includes at least one of a request to initiate a refueling transaction, fuel data indicative of the type of fuel to be purchased, volume data indicative of the amount of fuel to be purchased, purchase amount data indicative of the dollar amount of fuel to be purchased, payment data indicative of the manner of payment, and a request to terminate the fuel dispensing activity.

One advantage of the present invention is that a refueling operation may be performed while the customer remains in the vehicle by collecting the necessary refueling transaction data from the customer who simply transmits such information via suitable voice messages, instructions, and commands.

Another advantage of the present invention is that the voice-controlled fuel delivery system permits refueling stations to be fully handicapped accessible.

A further advantage of the invention is that the customer vehicle requires no additional equipment or retrofitting to implement the voice-activated refueling operation, which distinguishes from certain conventional systems that equip the vehicle with a communications device, for example, to wirelessly transmit command information from the vehicle to the fuel dispenser.

A further advantage of the invention is that the voice-activated fuel delivery system can be implemented with currently available electronic robotic arm assemblies that enable the dispensing nozzle apparatus to be deployed automatically in response to the customer-issued voice commands, thereby fully automating the fuel dispensing activity.

A further advantage of the invention is that the voice-activated fuel delivery system may be constructed as a fully functioning, self-contained unit that does not require the assistance or intervention of a human operator to perform any task associated with processing and executing the refueling transaction request.

Yet another advantage of the invention is the ability to train users through voice interrogation to use newly added features on a fueling dispenser (i.e., insert card with magnetic strips down, remove nozzle to start fueling, etc.).

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
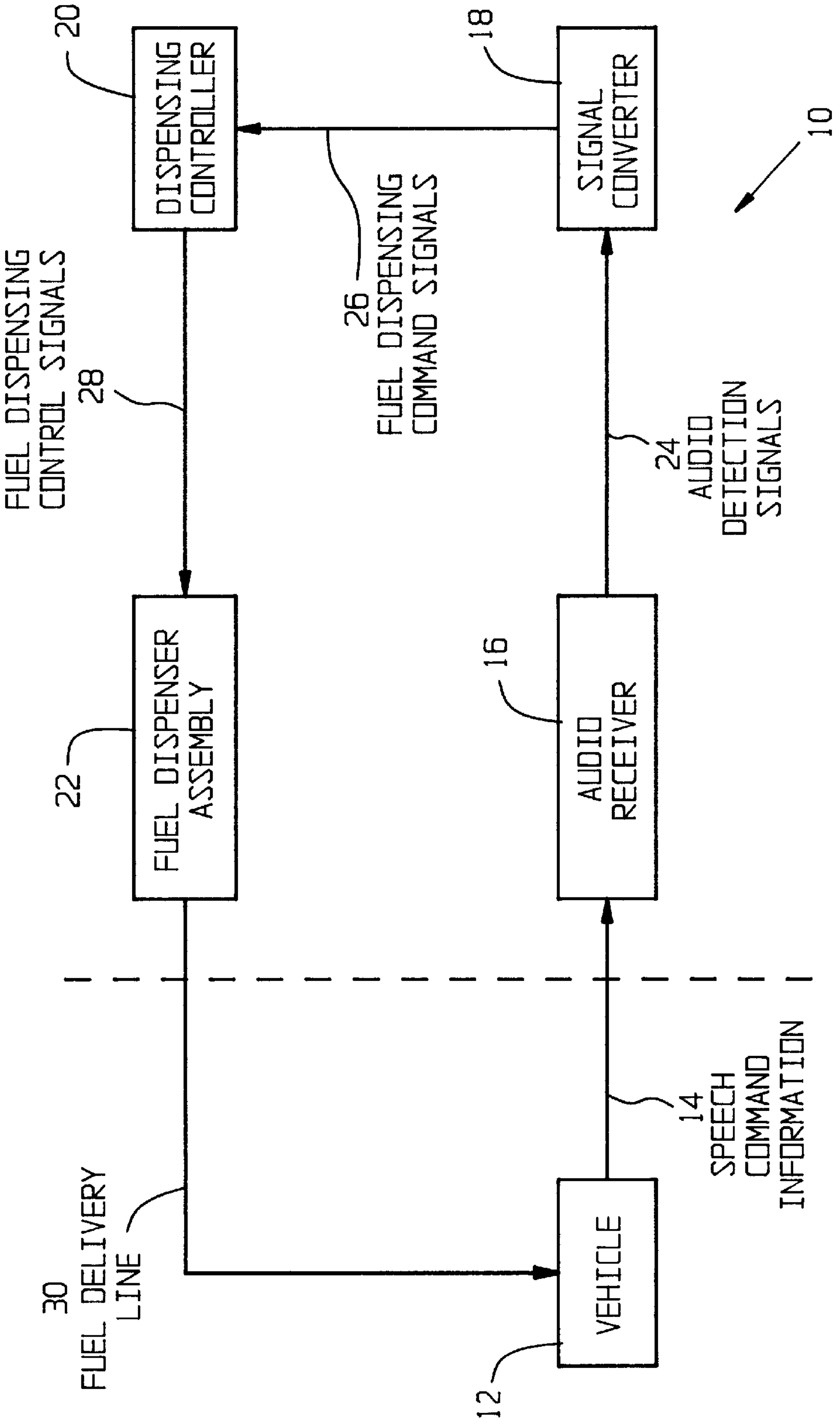
FIG. 1 is a block diagram illustration of a fuel delivery system according to the present invention.

Referring now to the drawings and particularly to FIG. 1, there is illustratively shown in block diagram format a voice-activated fuel delivery system 10 according to the present invention for use in dispensing fuel into a vehicle 12 positioned for refueling. System 10 dispenses fuel in response to and in accordance with voice command information 14 which is issued by the customer and represents refueling transaction request information. The customer preferably remains seated in the vehicle during the entire refueling transaction. System 10, in one form thereof, includes an audio receiver 16, a signal converter 18, a controller 20, and a fuel dispenser assembly 22.

Audio receiver 16 detects any of various audio signals which are preferably generated by the customer in spoken fashion, and provides audio detection signals 24 representative thereof. These customer audio signals include voice command information 14 which pertains to refueling transaction information such as a request to initiate a refueling transaction, fuel data indicative of the type of fuel to be purchased, volume data indicative of the amount of fuel to be purchased, purchase amount data indicative of the dollar amount/volume of fuel to be purchased, payment data indicative of the manner of payment, and a request to terminate the fuel dispensing activity.

Signal converter 18 transforms the audio detection signals 24 provided by audio receiver 16 into corresponding fuel dispensing command signals 26 for use in suitably controlling the fuel dispensing activity of fuel delivery system 10 based upon the customer refueling instructions which are embodied and otherwise contained within voice command information 14. Controller 20 is responsive to the fuel dispensing command signals 26 provided by signal converter 18 and generates corresponding fuel dispensing control signals 28 in accordance therewith. Fuel dispenser assembly 22 controllably dispenses fuel into vehicle 12 along fuel delivery line 30 in response to and in accordance with the fuel dispensing control signals 28 provided by controller 20.

For a fully automated implementation of fuel delivery system 10, the fuel dispenser assembly 22 would preferably be provided in the form of a controllable robotic arm assembly capable of maneuvering and otherwise repositioning the fuel nozzle assembly into a selective one of refueling engagement with and disengagement from the vehicle fuel filler pipe. Alternatively, the fuel dispensing activity may be operator-assisted insofar as having a service station employee being responsible for manually placing the nozzle assembly into its respective positions of engagement and disengagement, under the direction of suitable dispensing commands issued by fuel delivery system 10.

The components identified above in connection with FIG. 1 are preferably integrated into a unit suitable for installation within the fuel dispensing equipment that is currently in place at service station kiosks. Alternatively, the components may be assembled as part of the fuel dispensing equipment that is shipped for installation. Additionally, current equipment can be easily modified to accommodate the integration of these components.

Figure 2:
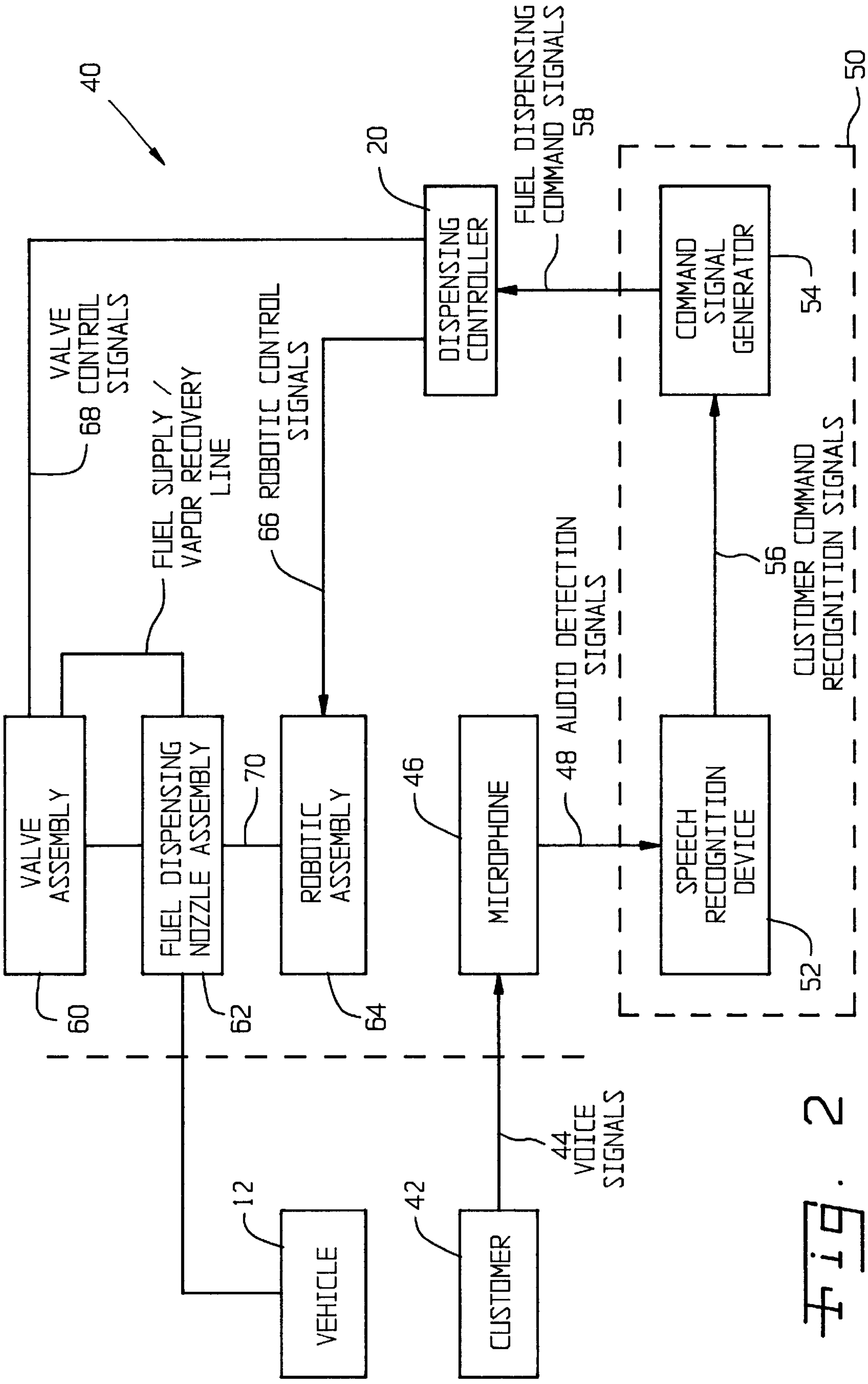
FIG. 2 is a block diagram illustration of a fuel delivery system in accordance with one embodiment of the present invention.

Referring now to FIG. 2, there is disclosed in block diagram format a voice-activated fuel delivery system 40 for use in delivering fuel to a vehicle 12 positioned for refueling based upon customer transaction information forwarded by customer 42 to system 40 in the form of voice signals 44, according to one embodiment of the present invention. As discussed further, customer 42 is able to communicate with system 40 while remaining seated within vehicle 12 and preferably does not need to leave the vehicle at any point during the refueling transaction period.

Referring more particularly to FIG. 2, the illustrated voice-activated fuel delivery system 40 includes an audio detection unit provided in the form of a microphone 46 suitably disposed to enable detection of voice signals 44 generated by customer 12. As described more fully below, voice signals 44 include customer transaction information and refueling commands which aim to request, direct, and otherwise facilitate the performance of a refueling operation by fuel delivery system 40. Voice signals 44 correspond, for example, to voice command information 14 of FIG. 1. Microphone 46 produces audio detection signals 48 which correspond, for example, to an electrical waveform representation of the customer voice signals 44. The audio detection signals 48 are provided to a conversion unit 50 in order to translate and otherwise transform the customer transaction information into corresponding command signals which are suitable for use by the fuel dispensing apparatus to properly implement and carry out the requested refueling transaction.

The illustrated conversion unit 50 includes a speech recognition device 52 of conventional construction which analyzes, examines, and otherwise processes the audio detection signals 48 provided by microphone 46 to properly identify and otherwise determine the refueling parameters and commands which the customer has transmitted as voice signals 44. For this purpose, speech recognition device 52 may be provided with a customer command database comprising a plurality of data elements each representing a possible customer response, utterance, or other such verbal message relating to the refueling transaction. Upon receiving audio detection signals 48, the speech recognition device 52 would conduct a signal evaluation by performing a comparison operation between signals 48 and the data elements contained within the customer command database. When a match is found, the recognized customer command/instruction is representatively provided as an output in the form of customer command recognition signals 56.

Command signal generator 54 converts and/or formats (if necessary) the customer command recognition signals 56 into corresponding fuel dispensing command signals 58 which serve as suitable input signals for controller 20, thereby facilitating the development and implementation of the control function which takes place under the direction and supervision of controller 20. Speech recognition device 52 is preferably provided with a parsing functionality which enables it to isolate and identify the individual customer commands when they are provided as part of a composite voice transmission that includes various refueling instructions. It is preferred, however, that the refueling information be provided by the customer in some type of ordered sequence or protocol wherein a distinct voice transmission is used to communicate a corresponding refueling parameter.

The fuel dispensing apparatus which forms part of fuel delivery system 40 includes an electrically programmable valve assembly 60, a fuel dispensing nozzle assembly 62, and a robotic assembly 64, all of conventional construction, which are actuated in accordance with control signals supplied by controller 20. Controller 20 develops the appropriate set of control instructions needed to effectuate and otherwise implement the refueling transaction commands which are represented by the fuel dispensing command signals 58 provided by command signal generator 54. In particular, controller 20 generates robotic control signals 66 and valve control signals 68 in accordance with fuel dispensing command signals 58. Robotic assembly 64 actuates movement of nozzle assembly 62 into a selective one of engagement and disengagement with the fuel filler pipe of vehicle 12 in accordance with robotic control signals 66. This selective coupling of robotic assembly 64 with fuel dispensing nozzle assembly 62 is illustratively indicated by connectivity link 70. Valve assembly 60 is reprogrammed in accordance with valve control signals 68 to ensure delivery of the proper grade and amount of fuel as indicated by fuel dispensing command signals 58. Valve assembly 60 may be considered as forming part of a fuel metering apparatus which functions to controllably regulate the amount and type of fuel being dispensed.

Figure 3:
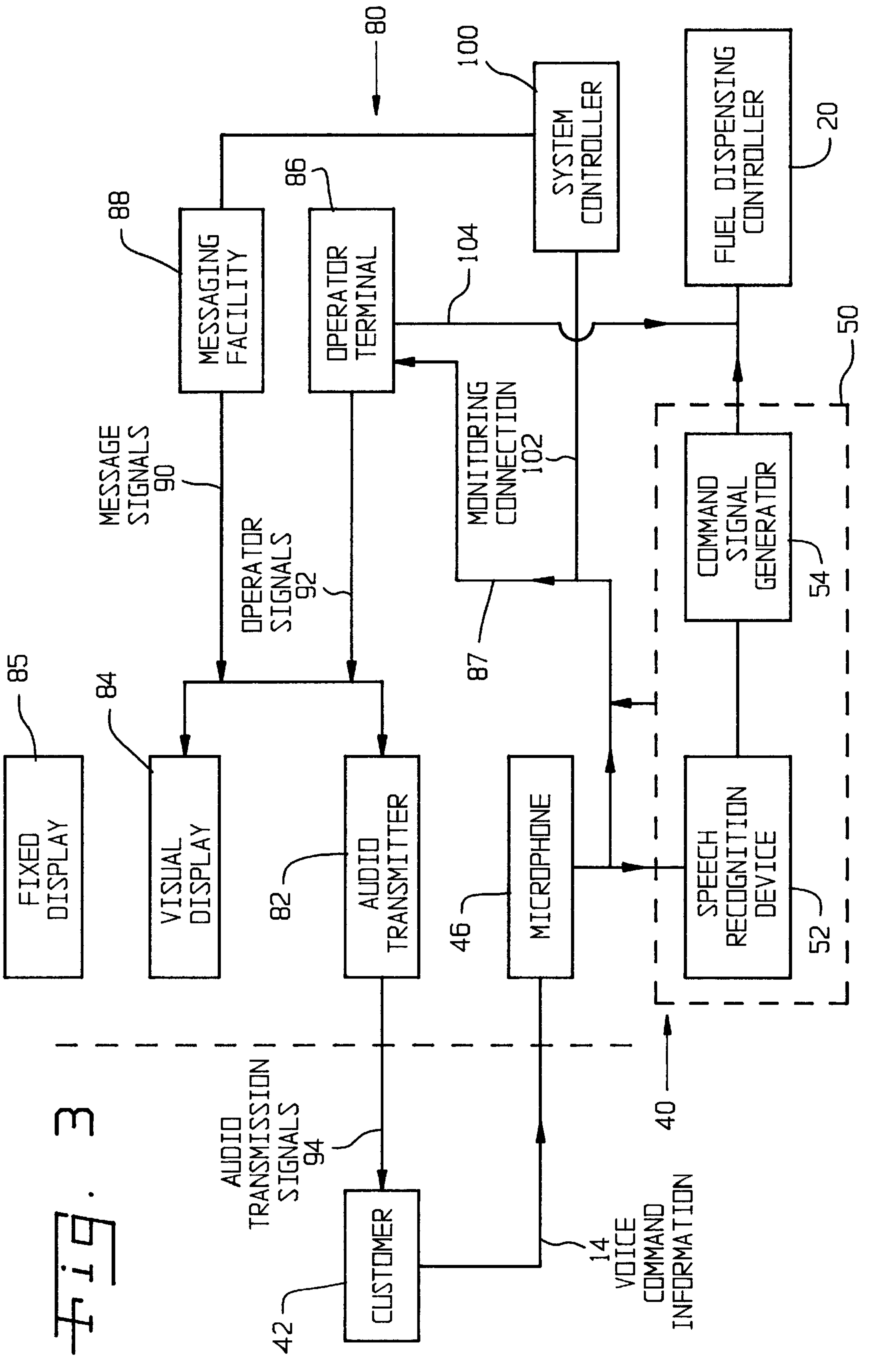
FIG. 3 is a block diagram illustration of an operator transmission apparatus for use in the fuel delivery system of FIG. 2 to enable audio communication with the customer.

Referring now to FIG. 3, there is shown in block diagram format a communications apparatus 80 for use in the fuel delivery system 40 of FIG. 2 to enable operator communications originating from the service station side to reach customer 42. FIG. 3, in particular, shows the manner in which communications apparatus 80 is integrated within fuel delivery system 40 to facilitate various modes of communication between customer 42 and the service station installation. For example, as discussed further, communications apparatus 80 supports various modes of communication with customer 42 including, inter alia, a unidirectional voice communications mode in which the customer makes audible refueling decisions based upon a review of the selection items that are associated with a visible menu, which is either permanently displayed or continuously updateable. Another operational procedure relates to a fully-automated bidirectional audio communications mode in which the refueling transaction protocol involves the audible transmission of prerecorded messages from the service station side (e.g., refueling queries and other such interrogatories), to which the customer develops audible responses. Another protocol involves an operator-assisted bidirectional audio communications mode in which the service station operator and customer engage in a dynamic audio-based information exchange.

The illustrated communications apparatus 80 includes an audio transmitter 82 preferably provided in the form of a conventional speaker. A visual display module 84 is preferably provided in the form of an annunciator panel or other such display means. The visual display module 84 may be of the electronic bulletin board type or other such electronic-based input display device to enable an operator to gain on-line access thereto, thereby permitting electronic messages to be posted or otherwise displayed on a screen in a scroll-like fashion or in fixed form. A fixed display panel 85 may also be used to display a fixed set of instructions which the customer needs to follow in order to furnish fuel delivery system 40 with the information necessary to initiate and complete a refueling transaction.

Communications apparatus 80 further includes an operator terminal 86 such as a personal computer or other such input device which enables an operator to generate queries or any other communication. This information can then be transmitted to customer 42 via visual display 84 and/or audio transmitter 82. Operator terminal 86 will preferably be provided with a link 87 that connects it to microphone 46 and/or conversion unit 50 to enable the operator to receive the voice transmissions issued by the customer. A messaging facility 88 provides a plurality of prerecorded messages which represent queries and other such interrogatories that are designed to elicit from the customer the information needed to process the refueling transaction. For this purpose, messaging facility 88 is preferably provided with some form of message storage unit from which the refueling queries can be retrieved and then transmitted to the customer via visual display 84 and/or audio transmitter 82.

As noted above, communications apparatus 80 provides various means by which information from the service station side can be communicated to the customer. For example, in accordance with one operating mode of the present invention, information can be visually presented to the customer using visual display 84. This information can be supplied to visual display 84 in the form of message signals 90 issued from messaging facility 88 and/or operator signals 92 issued from operator terminal 86, which are then suitably formatted to appear in menu-type form, for example. It is clear from this particular type of operating mode that audio communications are made only between the customer 42 and fuel delivery system 40, i.e., microphone 46. Alternatively, in accordance with another operating mode of the present invention, it may be desired to provide bidirectional audio communications between the customer and the communications apparatus 80 installed on the service station side. In one implementation of such bidirectional communications mode, information may be provided to the customer in the form of a series of packetized messages generated by messaging facility 88 (i.e., message signals 90), which are then audibly communicated to the customer via audio transmitter 82 as audio transmission signals 94. In another bidirectional implementation, the service station operator can engage in a conversation-style dynamic audio exchange with the customer by establishing an on-line audio connection with the customer via audio transmitter 82.

Various transaction protocols may also be used to determine the manner and order in which the customer transaction information is collected and processed to efficiently execute the refueling request. For this purpose, fuel delivery system 40 is preferably provided with an overall system controller 100 to coordinate, supervise, monitor, and otherwise administrate the transaction processing activities. One possible transaction protocol based upon a query-response exchange involves the issuance of a transaction query by operator terminal 86 and its transmission by audio transmitter 82, for the purpose of eliciting customer information such as the type and quantity of desired fuel. Operator terminal 86 would then proceed with the next query after the customer has properly responded to the prior query, which is disclosed to operator terminal 86 via the communications pathway established over connection link 87. If messaging facility 88 is instead being used to make the refueling inquiries, system controller 100 would monitor for a customer response via monitoring connection 102 and instruct messaging facility 88 either to repeat the inquiry if the response period has expired without detection of a customer voice signal or to proceed to the next transaction query when a proper response has been received and recognized.

Coordination may be provided between the various illustrated components such as system controller 100 and speech recognition device 52 to ensure that the customer response qualifies as a valid response to the particular transaction query. For example, the database of possible customer responses which is used in conjunction with speech recognition device 52 may be organized into various query response categories such that the voice recognition function will access the proper customer response category based upon a query identification signal supplied thereto from system controller 100, for example.

Once the necessary transaction information has been collected from the customer and the refueling request has been authorized in the conventional manner, fuel delivery system 40 proceeds with execution of the fuel dispensing control function in order to supply the vehicle with the requested fuel. When it is desired that fuel delivery system 40 perform this refueling activity in a fully-automated manner, the proper development and application of the fuel dispensing control signals is best illustrated in the arrangement of FIG. 2. More specifically, command signal generator 54 automatically generates, in response to the customer command recognition signals 56 issued by voice recognition device 52, fuel dispensing command signals 58 which are forwarded to controller 20 to carry out the control command instructions in conjunction with the fuel dispensing apparatus. When some level of operator involvement is desired, operator terminal 86 may be provided with a control connection 104 that is suitable for use in allowing the operator to provide fuel dispensing controller 20 with fuel dispensing command signals, which serves as an alternative to the automatic generation of such command signals via command signal generator 54.

Figure 4:
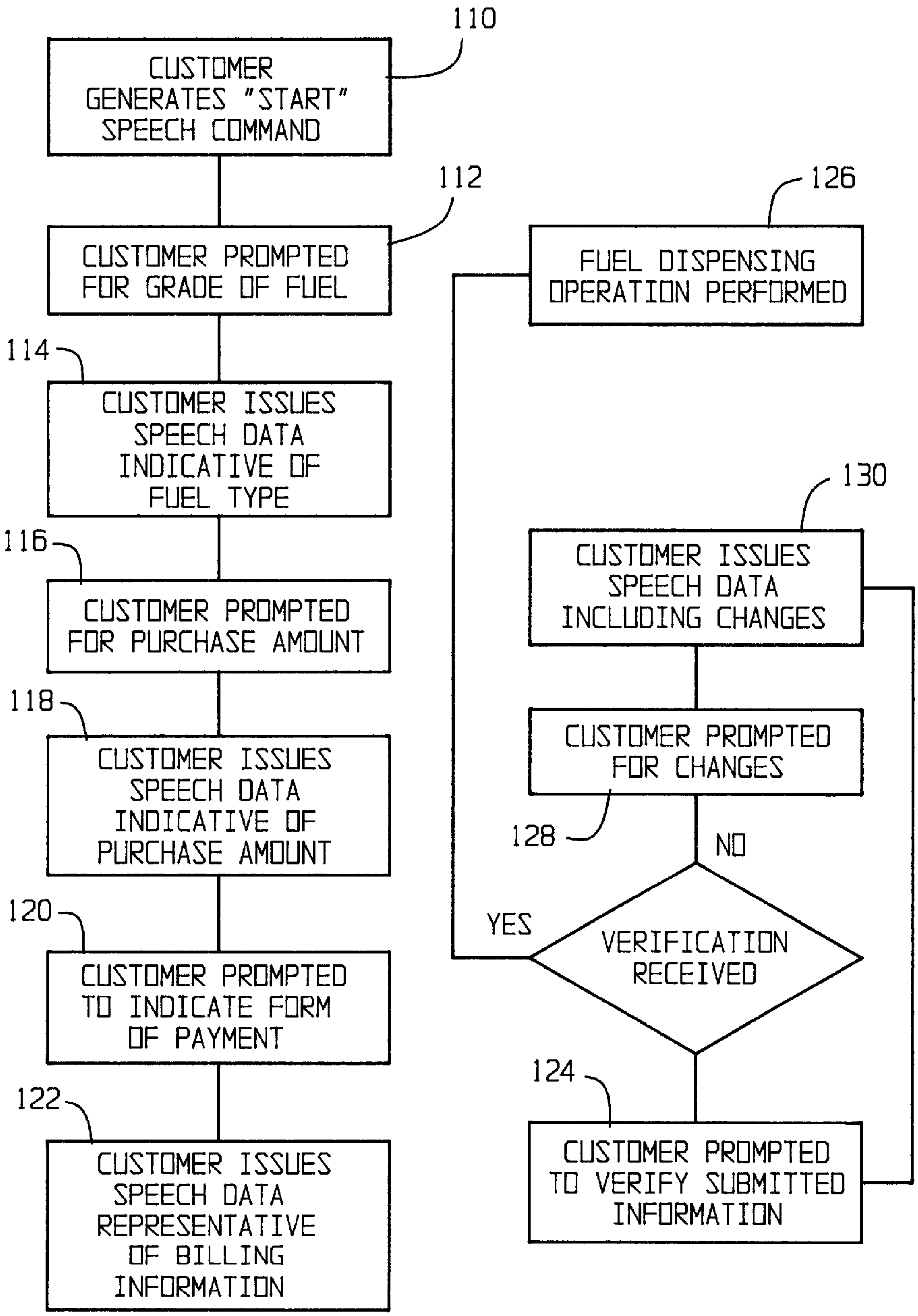
FIG. 4 is a flow diagram illustrating the sequence of operations for performing a refueling operation based upon a customer transaction request using the fuel delivery system of FIG. 2.

Reference is now made to FIG. 4 in conjunction with FIGS. 2 and 3 in order to describe the operation of the present invention. More particularly, FIG. 4 discloses a flow diagram which illustrates the sequence of operations performed by fuel delivery system 40 in order to process and otherwise execute a refueling transaction request made by a customer associated with vehicle 12. For purposes of illustration and not in limitation hereof, the flow diagram relates to a customer transaction which involves the bidirectional transmission of information in the form of audible signals between the customer and fuel delivery system 40.

After the vehicle is suitably positioned for refueling, the customer commences the refueling transaction by generating an audible "START" command or other form of initiation-type voice command that is intended for reception by microphone 46. The customer is prompted to provide various refueling parameters related to the transaction request. For example, fuel delivery system 40 requires customer information such as grade of fuel, amount of purchase (e.g., expressed in monetary value or fuel volume), and form of payment (e.g., credit card account information). The appropriate interrogatories designed to elicit this information are communicated to the customer via audio transmitter 82 in conjunction with messaging facility 88 and/or operator terminal 86, which generate suitable requests in the form of voice signals that are forwarded for subsequent transmission. As shown by steps 112, 116, and 120 in FIG. 4, one illustrative operation may involve a series of separate interrogatories to which the customer responds individually as indicated by steps 114, 118, and 122, respectively. The particular order of requests indicated in FIG. 4 should not be considered in limitation of the present invention as it should be apparent that the customer may be prompted for the refueling information in any other sequence and/or by combining the requests into compound queries.

The customer is preferably asked to confirm and otherwise verify the transaction parameters previously submitted (step 124). If customer voice verification is received, the fuel dispensing activity is performed in accordance with the refueling parameters compiled from the customer (step 126). Otherwise, the customer is given the opportunity to make any changes to the refueling data (steps 128 and 130).

The program of operation described by FIG. 4 should not be considered in limitation of the present invention as it should be apparent that various modifications and adaptations can be made within the scope of the present invention. For example, instead of sequentially providing refueling information in response to a set of individual queries, the customer may simply submit an audible transaction request that contains all of the needed information. The customer, for example, may issue a composite voice message that provides in one single continuous communication all of the information needed by fuel delivery system 40 to proceed with and otherwise execute the refueling activity. For this purpose, the speech recognition device 52 will be equipped with the ability to parse the composite voice message in order to identify and otherwise determine the individual refueling commands contained therein. Such a composite voice communication from the customer would obviate the need for fuel delivery system 40 to audibly elicit information from the customer. In another alternative approach, the customer could simply issue a "START" voice command to initiate the refueling operation and then issue a "STOP" command to terminate the refueling activity, without the need to provide specific refueling termination points (i.e., a definite volume or purchase amount). As a further enhancement, the service station installation may be provided with vehicle detectors such as speed bump sensors or a closed-circuit surveillance camera in order to bring fuel delivery system 40 online and to alert the operator to the presence of a vehicle so that an opening introduction or other such statement can be made from the operator to the customer to commence the refueling transaction.

Figure 5:
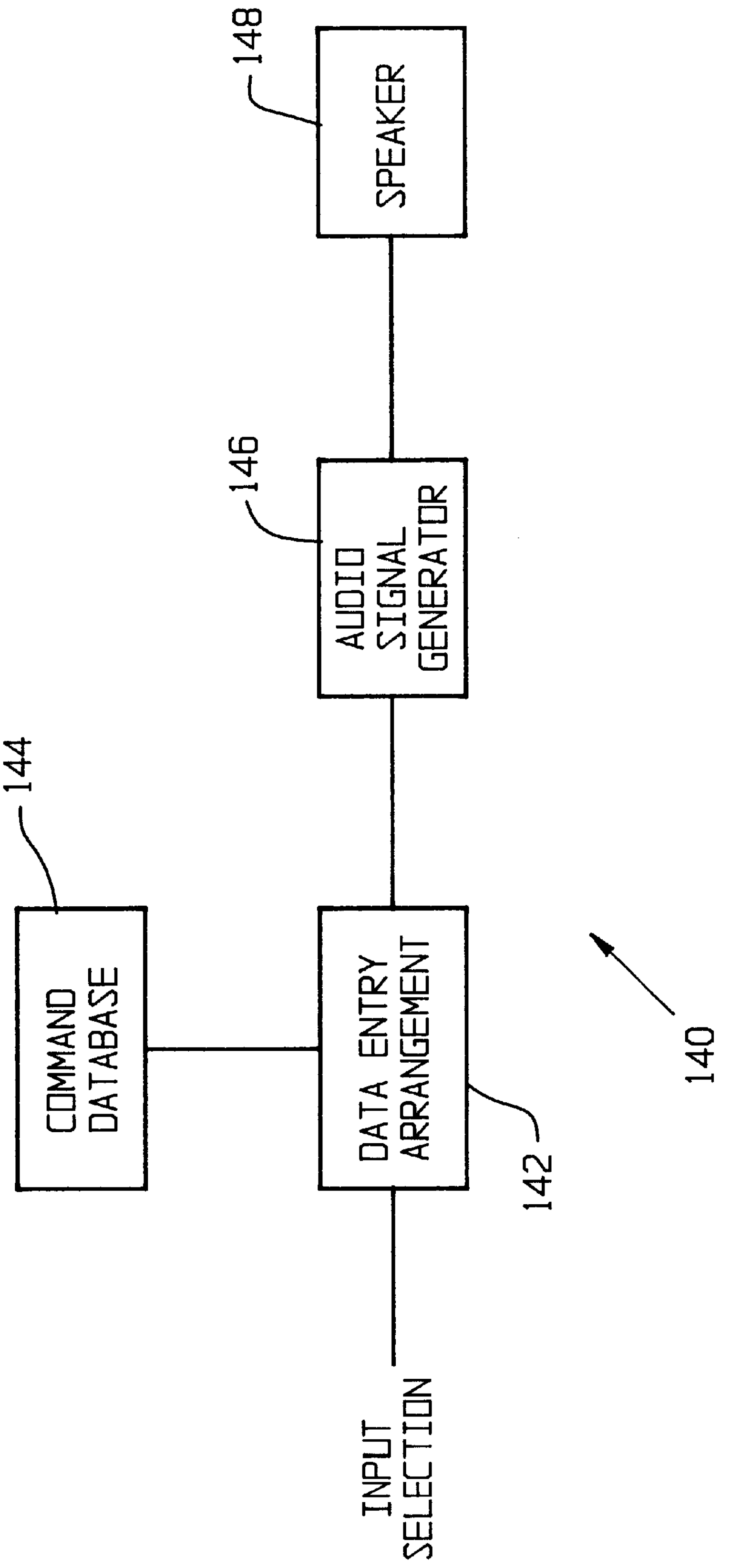
FIG. 5 is a block diagram illustration of an optional audio transmitting arrangement enabling the refueling customer to generate synthesized or prerecorded voice commands using an on-board customer input device, in accordance with another aspect of the present invention.

Referring now to FIG. 5, there is shown a vehicle-equipped, on-board customer input device 140 installed for the purposes of enabling the customer to artificially transmit voice commands based upon customer input refueling command data. The illustrated input device 140 includes a data entry arrangement 142 such as a manual input keypad that allows the customer to generate the full text of a voice message or to select from a set of prerecorded voice messages stored in command database 144 by entering an input selection which is keyed to the particular voice message. An audio signal generator 146 such as a speech synthesizer produces the audio signal for transmission by speaker 148.

This on-board vehicle module finds particular use with customers who possess a speech impediment or other such disability (e.g., a mute person) that makes it difficult to communicate refueling voice commands in a manner that is intelligible to fuel delivery system 40. It is clear that fuel delivery system 40 generally provides a simple and effective means to execute a refueling transaction for handicapped persons, individuals who cannot exit and reenter the vehicle easily or at all, and others who may have physical limitations in regard to performing any of the other tasks attending a refueling operation.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A fuel delivery system using speech recognition for fueling a vehicle, comprising:

a fuel dispenser assembly operatively arranged to controllably dispensing vehicular fuel into a vehicle positioned for refueling, said vehicle having a customer associated therewith; and a control assembly operatively arranged to control the fuel dispensing activity of said fuel dispenser assembly in response to and in accordance with at least one voice command signal generated by said customer.

2. The fuel delivery system as recited in claim 1, wherein said control assembly further comprises:

a speech recognition device, responsive to said at least one voice command signal generated by said customer, for transforming said at least one voice command signal into at least one corresponding fuel dispenser control signal useful in controlling said fuel dispenser assembly; and means for applying said at least one corresponding fuel dispenser control signal to said fuel dispenser assembly to effect operative control thereof.

3. The fuel delivery system as recited in claim 2, wherein said control assembly further comprises:

a microphone to detect said at least one voice command signal generated by said customer and to provide a voice detection signal representative thereof to said speech recognition device.

4. The fuel delivery system as recited in claim 1, wherein said control assembly further comprises:

a speaker to enable audio communication with said customer; and a microphone to enable detection of voice signals generated by said customer.

5. The fuel delivery system as recited in claim 4, wherein said control assembly being operable in at least one mode thereof to perform a refueling transaction procedure in respect of said fuel dispensing activity, said refueling transaction procedure comprising the following steps:

prompting the customer to provide refueling transaction information;

detecting voice signals representing refueling transaction information audibly provided by said customer in response to said prompting;

converting the detected voice signals into corresponding fuel dispenser control signals; and controlling said fuel dispenser assembly in accordance with said corresponding fuel dispenser control signals.

6. The fuel delivery system as recited in claim 5, wherein said refueling transaction information includes at least one of a request to initiate a refueling transaction, fuel data indicative of the type of fuel to be purchased, volume data indicative of the amount of fuel to be purchased, purchase amount data indicative of the dollar amount of fuel to be purchased, payment data indicative of the manner of payment, and a request to terminate the fuel dispensing activity.

7. The fuel delivery system as recited in claim 1, further comprises:

an input device being responsive to customer input information provided by said customer which is indicative of refueling transaction commands, for producing audio control information representative of said customer input information; and signal means for transmitting at least one voice signal in accordance with the audio control information produced by said input device for reception by said control assembly.

8. A fuel delivery system using speech recognition for fueling a vehicle, comprising:

fuel dispenser means, responsive to fuel dispensing control signals, for controllably dispensing vehicular fuel into a vehicle positioned for refueling, said vehicle having a customer associated therewith;

control means, responsive to fuel dispensing command signals, for generating fuel dispensing control signals in accordance with said fuel dispensing command signals and providing said fuel dispenser means with said generated fuel dispensing control signals;

audio reception means for detecting audio signals generated by said customer and providing audio detection signals representative thereof, said audio signals generated by said customer being representative of refueling transaction information; and means, responsive to the audio detection signals provided by said audio reception means, for transforming said audio detection signals into corresponding fuel dispensing command signals for use by said control means.

9. The fuel delivery system as recited in claim 8, wherein:

said transforming means further includes a speech recognition device; and said audio reception means further includes a microphone.

10. The fuel delivery system as recited in claim 8, further comprises:

a speaker to enable voice communication with said customer.

11. The fuel delivery system as recited in claim 10, wherein said fuel delivery system being operable in at least one mode thereof to perform a refueling transaction procedure comprising the following steps:

prompting the customer to provide refueling transaction information;

detecting audio signals representing refueling transaction information audibly provided by said customer in response to said prompting;

converting the detected audio signals into corresponding fuel dispenser control signals; and controlling said fuel dispenser means in accordance with said corresponding fuel dispenser control signals.

12. The fuel delivery system as recited in claim 11, wherein said customer refueling transaction information includes at least one of a request to initiate a refueling transaction, fuel data indicative of the type of fuel to be purchased, volume data indicative of the amount of fuel to be purchased, purchase amount data indicative of the dollar amount of fuel to be purchased, payment data indicative of the manner of payment, and a request to terminate the fuel dispensing activity.

13. A method of performing a refueling transaction using speech recognition for fueling a vehicle in association with a vehicle positioned for refueling, said vehicle having a customer associated therewith, said method comprising the steps of:

providing a fuel dispenser system operatively arranged for use in controllably dispensing vehicular fuel into said vehicle;

detecting audio signals generated by said customer, said audio signals representing command information pertaining to a refueling transaction request;

transforming the detected audio signals into corresponding fuel dispenser control signals; and controlling the fuel dispensing activity of said fuel dispenser system in accordance with said corresponding fuel dispenser control signals.

14. The method as recited in claim 13, wherein the command information pertaining to a refueling transaction request includes at least one of a request to initiate a refueling transaction, fuel data indicative of the type of fuel to be purchased, volume data indicative of the amount of fuel to be purchased, purchase amount data indicative of the dollar amount of fuel to be purchased, payment data indicative of the manner of payment, and a request to terminate the fuel dispensing activity.

15. A method of performing a refueling transaction using speech recognition for fueling a vehicle in association with a vehicle positioned for refueling, said vehicle having a customer associated therewith, said method comprising the steps of:

providing a fuel dispenser system operatively arranged for use in controllably dispensing vehicular fuel into said vehicle;

providing the customer with a menu of information defining a plurality of refueling transaction parameters;

prompting the customer to make a selection regarding a one of said plurality of refueling transaction parameters;

detecting an audio signal generated by said customer which is representative of the selection made by said customer in response to the prompting regarding said one refueling transaction parameter;

transforming the detected audio signal into a corresponding fuel dispenser control signal;

repeating said prompting step, said detecting step, and said transforming step with respect to at least another one of said plurality of refueling transaction parameters; and controlling the fuel dispensing activity of said fuel dispenser system in accordance with the corresponding fuel dispenser control signals provided in connection with each iteration of said prompting step, said detecting step, and said transforming step.

16. The method as recited in claim 15, wherein said prompting step further comprises the steps of:

providing at least one of a visual display of said menu of information and an audio transmission of said menu of information.

17. The method as recited in claim 15, wherein the selections made by said customer in response to the prompting regarding said plurality of refueling transaction parameters includes at least one of a request to initiate a refueling transaction, fuel data indicative of the type of fuel to be purchased, volume data indicative of the amount of fuel to be purchased, purchase amount data indicative of the dollar amount of fuel to be purchased, payment data indicative of the manner of payment, and a request to terminate the fuel dispensing activity.

18. The fuel delivery system as recited in claim 1, wherein said control assembly operatively arranged to control the fuel dispensing activity of said fuel dispenser assembly in response to and in accordance with at least two voice command signals generated by said customer.

* * * * *